United States Patent [19]

Berman et al.

[11] 3,948,090

[45] Apr. 6, 1976

[54] METHOD OF MEASURING DIMENSIONAL VARIATIONS IN A WORKPIECE

[75] Inventors: Irwin Berman, Upper Montclair; Charles F. Nash, Roseland; Robert Henschel, Lake Hiawatha; Joseph W. Schroeder, Clark; Anthony M. Mack; Bernardino M. Alfano, both of Somerville, all of N.J.

[73] Assignee: Foster Wheeler Energy Corporation, Livingston, N.J.

[22] Filed: Feb. 14, 1974

[21] Appl. No.: 442,451

[52] U.S. Cl. .................................. 73/89; 73/88 R
[51] Int. Cl.² ........................................... G01B 5/00
[58] Field of Search ............ 73/89, 88 R; 33/174 G, 33/147 D, 1 R

[56] References Cited
UNITED STATES PATENTS 1,711,347  4/1929  Härter.................................. 73/88
2,856,695  10/1958  Hochreiter....................... 33/174 G

OTHER PUBLICATIONS

O. A. Muller, American Machinist, 12/6/45, p. 101.

*Primary Examiner*—James J. Gill
*Assistant Examiner*—Anthony V. Ciarlante
*Attorney, Agent, or Firm*—Marvin A. Naigur

[57] ABSTRACT

A method of measuring dimensional variations in a workpiece in which two spaced points are formed on the workpiece and their images transferred to an image transfer material. After the workpiece has been subjected to a mechanical and/or thermal load and then allowed to return to its original unloaded state, the images of the points are again transferred to an image transfer material and the difference in spacing between the images of the points is compared to ascertain the dimensional changes.

7 Claims, 4 Drawing Figures

METHOD OF MEASURING DIMENSIONAL VARIATIONS IN A WORKPIECE

BACKGROUND OF THE INVENTION

This invention relates to a method of measuring dimensional changes in a workpiece and, more particularly, to such a method employing an image transfer technique.

Several problems exist with current techniques for measuring for dimensional variations, strain, etc., in structural materials subjected to relatively high mechanical and/or thermal loads, such as those incorporated in furnaces, heat exchangers, etc.

One of the most popular measuring techniques of this type utilize a strain gauge which is mechanically mounted to the surface of the structure to be measured. Although reasonably accurate under certain conditions, strain gauges will undergo major changes in their electrical and mechanical properties if subjected to an elevated temperature environment, which frequently introduces errors which can be in the order of ± 100 percent. Therefore, their practical use is limited to tests in which the workpiece is not subjected to extremely high temperatures. Also, strain gauges can only be used to measure relatively small strains which are generally less than 0.001 inches per inch, and, in general, can only be affixed to a flat surface which does not warp significantly during the test. The use of strain gauges also requires time-consuming and expensive bonding methods to affix the gauges to the surface of the structure to be tested, as well as the use of expensive electronic signal conditioning and readout equipment.

Other types of dimensional variation measurment methods include optical techniques utilizing photographic etching, holograph methods, etc. However, these techniques require extensive setup procedures and precise positioning of the optical equipment directly on the job sight. In addition to being time-consuming, these physical limitations render the optical methods impractical for many applications.

Other dimensional variation measurement techniques utilize various mechanical devices, such as vernier calipers, special micrometer fixtures, etc., which have as a major disadvantage the limitation that they cannot be used at elevated temperatures. Also, these devices cannot be used to measure variations in curved surfaced structures, and have inherent limitations on their accuracy.

SUMMARY OF THE INVENTION

It is, therefore, an object of the present invention to provide a dimensional variation measurement method which avoids all the problems of the prior art devices included above and yet which is simple and inexpensive in operation.

Toward the fulfillment of this and other objects, the method of the present invention comprises the steps of forming two spaced points on said workpiece, transferring said points to an image transfer material, then subjecting the workpiece to a mechanical and/or thermal load, and then transferring the images of said points to an image transfer material to enable the relative difference in the distance between said points to be compared to ascertain the dimensional changes.

DESCRIPTION OF THE PREFERRED EMBODIMENTS

Figure 1:
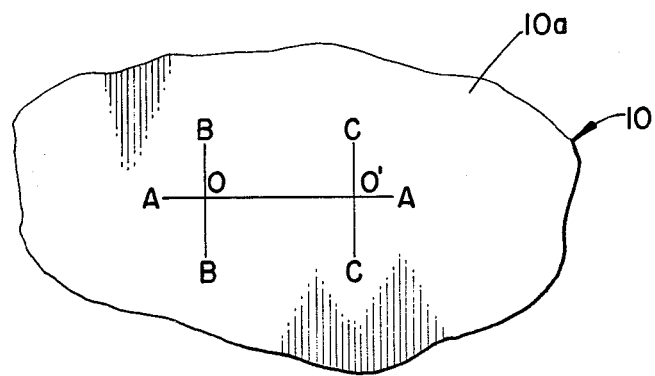
FIG. 1 is a front elevational view of a surface of a structure to be measured according to the method of the present invention.

For the purpose of example, the method of the present invention will be described in connection with measuring the strain of a structural workpiece, shown in general by the reference numeral 10 in FIG. 1, and having an upper surface 10a. Preferably, the surface 10a is initially polished by first grinding the area smooth, hand rubbing it with emery paper, and polishing it by using a rotating felt wheel and microfine polishing compound, or the like. Two target points are then scribed on the surface 10a, preferably by rolling a series of grooves by means of a scribing tool, such as a hollow ground carbide wheel mounted in a suitable holder. In particular, a line A—A, approximately 1 ½ inches long, is initially scribed on the surface 10a followed by a scribing of two parallel lines B—B and C—C which are spaced apart a predetermined distance, such as 1 inch, and which intersect the line A—A. The intersection between the line B—B and the line A—A defines a first target point O, and the intersection between the line C—C and the line A—A defines a second target point O'.

In general, the method of the present invention involves transferring the target points O and O' to an image transfer material both before and after the structure to be tested is subjected to a mechanical and/or thermal load.

Figure 2:
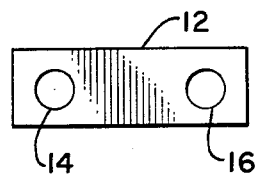
FIG. 2 is an elevational view showing a component of an image transfer assembly used in the method of the present invention.

The assembly for carrying out the image transfer includes a relatively inextensional but flexible strip 12, shown in detail in FIG. 2. The strip 12 may be 0.5 inches wide by 0.005 inches thick by 1.5 inches long and has two 0.25 inch diameter holes 14 and 16 formed therethrough, with the centers of the holes being approximately 1 inch apart to coincide with the spacing between the target points O and O'. The strip 12 is of a relatively strong material, such as metal, for reasons to be described in detail later.

Figure 3:
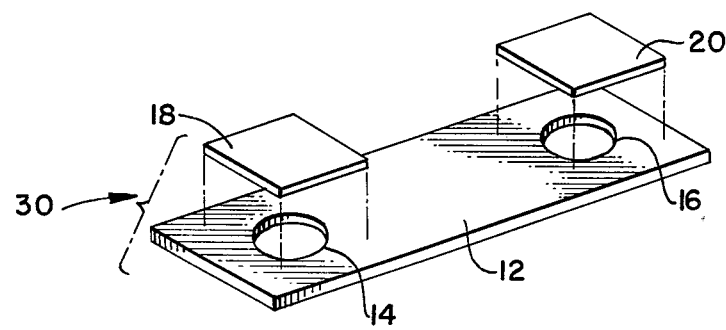
FIG. 3 is an exploded, enlarged perspective view of an image transfer assembly used in the method of the present invention.
Figure 4:
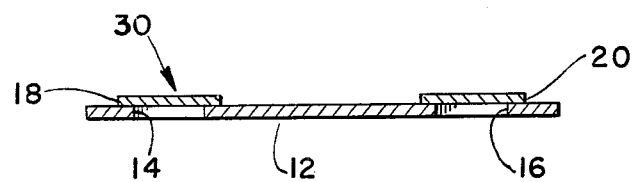
FIG. 4 is an enlarged, horizontal cross-sectional view of the assembly of FIG. 3 shown in an assembled condition.

Referring to FIGS. 3 and 4, the image transfer assembly also includes a pair of image transfer pads 18 and 20 which are affixed to one surface of the strip 12 and extend over the holes 14 and 16, respectively. The transfer pads 18 and 20 are dimensioned so as to completely cover the holes and may be of any conventional material readily adapted to transferring images, such as indium, or the like. The image transfer pads 18 and 20 extend over the holes 14 and 16, with adhesive or the like being provided to affix the pads 18 and 20 to the strip 12.

The assembly formed by the strip 12 and the pads 18 and 20 is shown in its assembled condition in FIG. 4 and is referred to in general by the reference numeral 30. It can be appreciated that the relative thicknesses of the strip 12 and the pads 18 and 20 have been exaggerated in FIGS. 3 and 4 for the benefit of clarity.

According to the method of the present invention, the assembly 30 is securely fastened to the surface 10a with the pads 18 and 20 extending directly over the points O and O', after which the center section of each pad which is exposed through the strip 12 to the points O and O' is lightly burnished or rubbed, preferably with a suitable hard-surfaced tool to transfer the images of the lines A—A, B—B, C—C, and therefore the points O and O', to the pads 18 and 20, respectively. In the burnishing or rubbing step, since the strip 12 is of a stronger material than the transfer pads 18 and 20, it does not deform significantly. Therefore, the only distortion that occurs is limited to the two relatively small transfer pads 18 and 20, with the relatively large region therebetween being distortion free, which, of course, minimizes errors in the overall measurement. It also has been discovered that if the burnishing strokes are carried out in a direction parallel to the lines B—B and C—C, distortion is further minimized.

The image transfer assembly 30 is then removed from the test specimen and placed upon a measuring device such as a high powered microscope having a "micrometer stage" and a measure scope, or the like, to measure the distance between the images of the points O and O' on the pads 18 and 20. The structure 10 is then subjected to the desired type and number of cycles of mechanical and/or thermal loading and is then allowed to return to its unloaded state at ambient temperature.

Another image transfer assembly 30, identical to the one described above, is then securely fastened to the surface 10a so that its transfer pads line up with the points O and O' and the technique described above is again repeated in order to transfer the images of the latter points onto the pads. The distance between the points O and O' is again measured and this value is compared to the value of the distance between the points O and O' before the loads were applied. The difference in the above two measurements will, of course, enable the strain of the structure 10 to be calculated.

In addition to reducing errors by virtue of minimizing distortions as discussed above, several other advantages result from the method of the present invention. For example, since all image transfers and readings are made at room temperature, there is no possibility of any type of changes in their physical or mechanical properties. Also, there is no practical limitation on the maximum residual strain or dimensional variations that can be measured by the method of the present invention. Further, the method of the present invention can be applied to surfaces of structure which are not easily accessible, since the only space needed is that which is required to scribe the reference lines and make the image transfer impressions.

The method of the present invention also eliminates the requirement for precise positioning of optical equipment or the like, while the measurements are not significantly affected by warping of the structure whose dimensions are being measured. Also, variations in a surface of virtually any shape or curvature can be measured according to the method of the present invention. Further, the method of the present invention enjoys the additional advantage of being economical since, among other things, it eliminates the requirement for electronic instrumentation. Still further, the method of the present invention enables a permanent record of the measurements to be made.

Of course, variations in the method of the present invention can be made by those skilled in the art without departing from the invention as defined in the appended claims.

What is claimed is:

1. A method of determining dimensional changes in a workpiece comprising the steps of establishing two points on said workpiece a predetermined distance apart, forming a strip of rigid material having two holes therein spaced apart a distance corresponding to the distance between said points, securing two pads of image transfer material to said strip with each pad extending over a corresponding hole, rubbing said pads over said points to transfer the images of said points to said pads, then subjecting the workpiece to a predetermined load, then forming an additional strip of rigid material having two holes therein spaced apart a distance corresponding to the distance between said points, then securing two additional pads of image transfer material to said additional strip with each additional pad extending over a corresponding hole and then rubbing said additional pads over said points to transfer the images of said points to said additional pads, to enable any relative difference in said distances to be compared to ascertain any dimensional changes in said workpiece.

2. The method of claim 1 wherein said steps of transferring are done on separate image transfer materials.

3. The method of claim 1 wherein said step of forming comprises the steps of scribing a single gridline and scribing two spaced gridlines intersecting said single gridline and extending perpendicular thereto.

4. The method of claim 1 further comprising the steps of measuring the distance between said points on an image transfer material before said step of subjecting, and measuring the distance between said points on an image transfer material after said step of subjecting, to enable any strain on said workpiece caused by said load to be calculated.

5. The method of claim 1 wherein said predetermined load is a thermal load and/or mechanical load.

6. The method of claim 1 further comprising the step of relieving said load before said second step of transferring.

7. An image transfer method for use in determining dimensional changes in a workpiece, said method comprising the steps of forming a strip of rigid material having at least two holes therein spaced apart a distance corresponding to the distance between corresponding points on said workpiece, securing a plurality of pads of image transfer material to said strip with each pad extending over a corresponding hole, and rubbing said pads over said points to effect said transfer.

* * * * *